March 11, 1947.       J. C. WHITESELL, JR       2,417,337
TANK ESPECIALLY FOR VEHICLES
Filed Sept. 15, 1943

INVENTOR
John C. Whitesell, Jr.
BY John P. Torbert
ATTORNEY

Patented Mar. 11, 1947

2,417,337

UNITED STATES PATENT OFFICE 2,417,337

TANK, ESPECIALLY FOR VEHICLES

John C. Whitesell, Jr., Narberth, Pa., assignor to Edward G. Budd Manufacturing Company, Philadelphia, Pa., a corporation of Pennsylvania Application September 15, 1943, Serial No. 502,465

2 Claims. (Cl. 220—22)

The invention relates to a tubular storage tank, especially for vehicles. Still more particularly, the invention relates to a self-supporting tank for road vehicles such as trucks, trailers or semi-trailers.

It is an object of the invention to simplify tanks of the indicated type.

A further object of the invention is a tank construction which lends itself to the easy connection of its constituents by electric welding, especially overlapped resistance welding.

A still further object of the invention is a tank which can be made of plane sheets so that the manufacture of the parts and the vehicle assembly will be at low cost.

Among the objects of the invention is also a tank which is light in weight and yet strong enough to withstand the heavy stresses to which it is subjected even if the tank itself does not serve as its own chassis.

The aforesaid and other objects of the invention are mainly achieved by assembling the tank of a plurality of sectors, preferably four sectors, each of which extends in the longitudinal direction of the tank body.

The attainment of the objects of the invention is also promoted by extending the upper sectors over the entire length of the vehicle, whereas the lower sectors extend only over the central portion thereof so that recesses are formed at the ends on the underside, which provide room for the supporting wheels.

The invention and its details as well as further objects and advantages thereof will be more fully understood from the embodiments illustrated in the attached drawing and described in the following:

Figure 2:
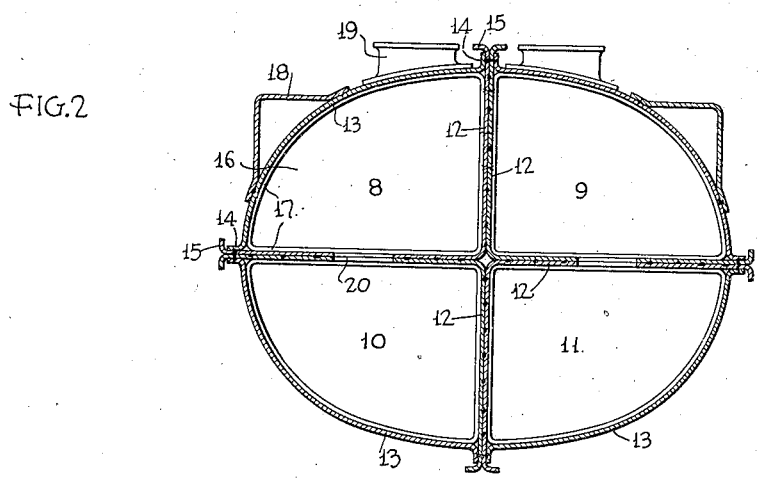
Figure 2 is a section along line 2—2 of Figure 1 on a larger scale.
Figure 3:
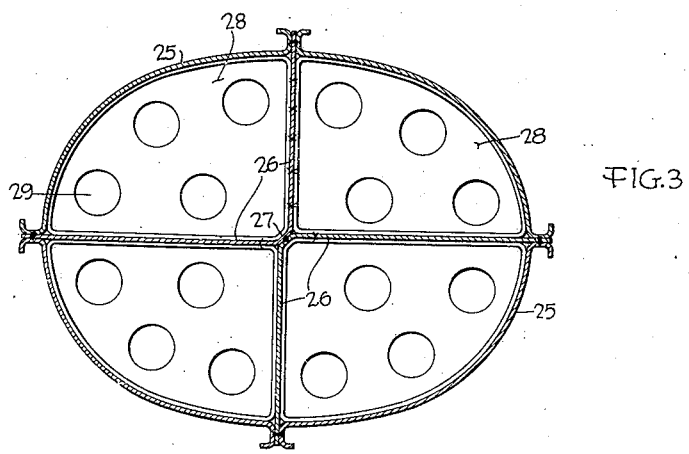
Figure 3 is a sectional view similar to Figure 2, yet of a modified form of the invention.

The tank body shown in Figures 2 and 3 comprises in the region between the rear wheels 5 and the fifth wheel support 6 of the tractor 7, four sectors 8, 9, 10 and 11, whereas above the wheels only the upper sectors 8 and 9 are continued. Each sector consists of an angle section plate 12 and a curved plate 13. The latter is secured through its marginal flanges 14 to the marginal portions of the plate 12. The margins of the plate 12 may be reinforced by laterally extending flanges 15. At the ends and at certain intervals, the sections are closed or subdivided, respectively, by vertical plates or bulkheads 16. These plates are provided throughout their margins with flanges 17 which rest against and are secured, such as by spot welding, to the plates 12 and 13.

Attached to the outside of the upper sectors 8 and 9 are catwalks 18 which serve simultaneously as reinforcement or longitudinal chord members. Filling or manholes 19 are arranged between each two transverse walls 16 on the upper sectors.

The described sectors 8, 9, 10 and 11 are secured together along their length by welding or other appropriate means. These connections are arranged along the outer margins and, preferably, also in the interior of the tank where the walls 12 overlap. The upper and lower sectors may communicate with each other through holes 20 provided in the walls 12. Similar holes may be provided in the vertical arms of the walls 12, in which case some of the manholes are dispensable.

Attached to the underside of the upper sectors 8 and 9 and to the end walls 16 of the lower sectors 10 and 11 are supporting structures 21, 22 for the front and rear wheels or, in the illustrated embodiment, at the front end for the fifth wheel arrangement 6.

Figure 1:
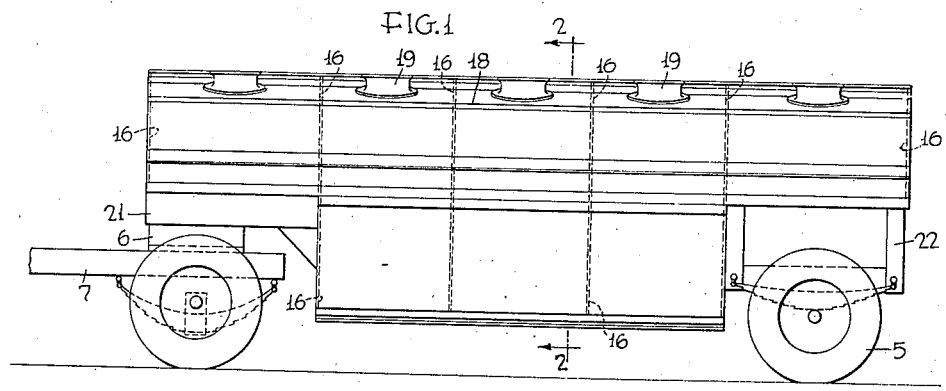
Figure 1 is a diagrammatic side elevation of a semi-trailer tank built in accordance with the invention.

The entire structure of the body illustrated in Figures 1 and 2 is built up of through-running longitudinal sheets 12 and 13 stiffened by numerous transverse bulkheads 16 and is divided into numerous small tanks. The body thus acts as a tubular beam reinforced against buckling by the numerous transverse bulkheads.

The construction, a cross section of which is shown in Figure 3, differs from the construction of Figures 1 and 2 in two respects: in the formation of the longitudinal partition walls, and in a detail of the transverse bulkheads. Otherwise, the construction may be identical.

The arcuate section outer sheathing members 25 are, in Figure 2, substantially identical with the members 13 of Figure 1. Instead of the four angle section members 12 in Figure 2, there are in Figure 3 but two angle section members 26 which serve alone as partitions between the adjoining sectors. It is evident that at the ends over the wheel locations the downwardly extending arm of one of the plates 26 is omitted. The two plates 26 are connected along their length at the apex 27 of the angle sections.

The transverse bulkheads 28 in this embodiment, or at least some of them, are provided with openings 29 so that a tank extends across several bulkheads, or it may even extend over the entire length of the vehicle.

The invention is not restricted to the illustrated embodiments but the attached claims are intended to cover all such embodiments which will occur to those skilled in the art.

What is claimed is:

1. Tubular horizontal storage tank composed of more than two sectors, each of said sectors comprising an arcuate section plate constituting the outer shell and separated from the adjoining sectors by partition walls forming main load transmitting structural elements, adjoining ones of said sectors comprising each an angle-section longitudinally extending plate with radially arranged arms the margins of which are secured to the margins of the respective arcuate section plate, adjoining sectors being connected with each other by the overlapping arms of the angle-section plates which constitute said partition walls.

2. In a tubular storage tank, especially for vehicles, which is horizontally non-rotatably supported at widely spaced points along its length, the combination of longitudinally arranged wall segments constituting the tubular shell of the tank and of horizontally and vertically arranged interior partition walls, said segments and partition walls being secured together along their longitudinal margins and constituting the main load supporting elements of the tank, the upper ones of said segments, the upper part of the vertical partition wall and the horizontal partition wall extend over the entire length of the tank, whereas the lower ones of said segments and the lower part of the vertical partition wall terminate at least short of one end of the tank so as to provide room for supporting wheels.

JOHN C. WHITESELL, Jr.

REFERENCES CITED

The following references are of record in the file of this patent:

UNITED STATES PATENTS

| Number | Name | Date |
|---|---|---|
| 1,970,970 | Nolan | Aug. 21, 1934 |
| 2,049,132 | Moxey | July 28, 1936 |
| 505,715 | Milsted | Sept. 26, 1893 |
| 192,310 | Tippett et al. | June 19, 1877 |
| 2,011,161 | Robinson, Sr. | Aug. 13, 1935 |
| 1,750,258 | Brown | Mar. 11, 1930 |
| 1,894,675 | Dixon | Jan. 17, 1933 |
| 1,818,032 | Bell | Aug. 11, 1931 |
| 2,358,190 | Theriault | Sept. 12, 1944 |